April 11, 1939.  E. W. PALMER  2,153,639
BOOK
Filed Nov. 17, 1937   2 Sheets-Sheet 1
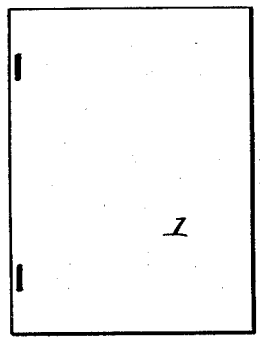
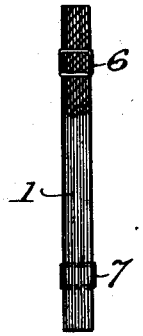
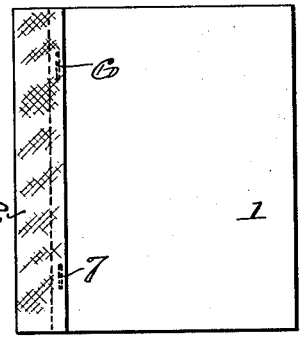
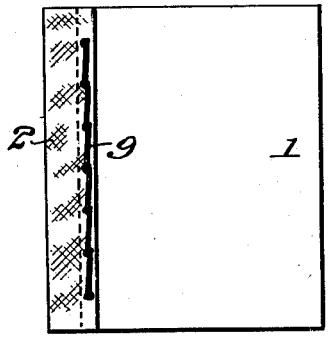
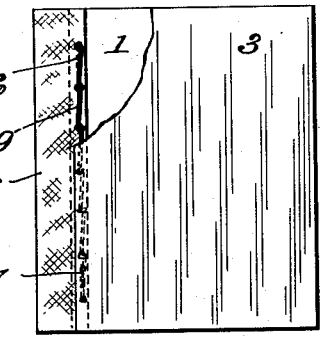
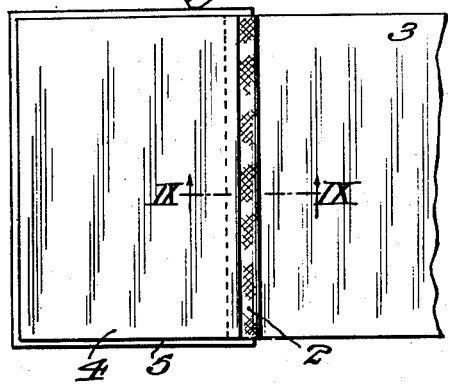
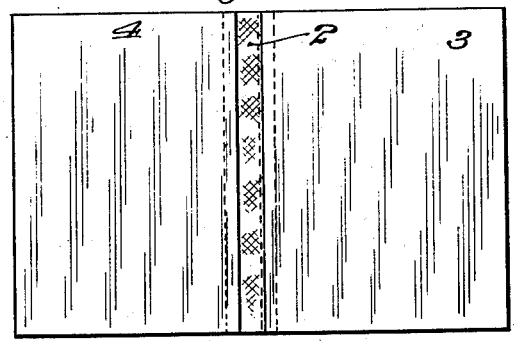
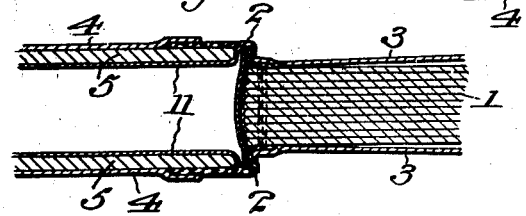
INVENTOR
Eldridge W. Palmer
BY
ATTORNEYS April 11, 1939.   E. W. PALMER   2,153,639
BOOK
Filed Nov. 17, 1937   2 Sheets-Sheet 2

INVENTOR
Eldridge W. Palmer
BY
ATTORNEYS

Patented Apr. 11, 1939

2,153,639

UNITED STATES PATENT OFFICE 2,153,639

BOOK

Elbridge W. Palmer, Kingsport, Tenn., assignor to Kingsport Press, Inc., Kingsport, Tenn., a corporation of Delaware Application November 17, 1937, Serial No. 174,936

1 Claim.  (Cl. 281—21)

In the building of books it is very desirable to bind the books so that the covers may be turned completely back without breaking or unduly weakening the book.

The object of my invention is to so secure the group of leaves forming the body of the book together and to the hinge strips, and to so secure the book boards to the hinge strips and the fly leaves, and to so secure the cover leaves to the hinge strips and cover boards as to obtain a book which will withstand the rough usage to which books are subjected, especially text books.

Practical embodiments of my invention are represented in the accompanying drawings, in which Fig. 1 represents a front view of a group of leaves forming the body of the book, said leaves in this embodiment being secured together by staples at their upper and lower back edges;

Fig. 2 represents a back view of the group of leaves, a portion being broken away to show the upper staples in full lines;

Fig. 3 represents a front view of the group of leaves after the overlapping portions of the hinge strips have been glued thereto;

Fig. 4 represents a similar view after the hinge strips have been side stitched to the group of leaves;

Fig. 5 represents a similar view after the inner edge of the fly leaves have been glued to the overlapping portions of the hinge strips over the side stitching, a portion of the front fly leaf being broken away to show the stitching in full lines;

Fig. 6 represents a similar view after the cover leaves have been glued to the free portions of the hinge strips;

Fig. 7 represents an end view of the same;

Fig. 8 represents a detail front view after the cover boards have been glued to the cover leaves and to the free portions of the hinge strips; and Fig. 9 represents a detail section on an enlarged scale taken in the plane of the line IX—IX of Fig. 8;

The group of leaves which forms the body of the book is denoted by 1, the two hinge strips by 2, the two fly leaves by 3, the two cover leaves by 4 and the two cover boards by 5.

Figure 10:
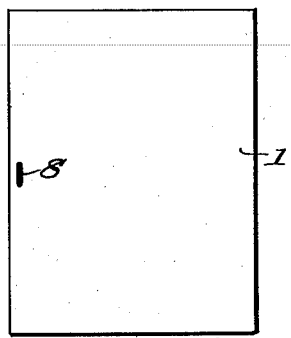
Fig. 10 represents a front view of a group of leaves forming the body of the book, said leaves in this embodiment being secured together at their middle back edges by a staple.
Figure 11:
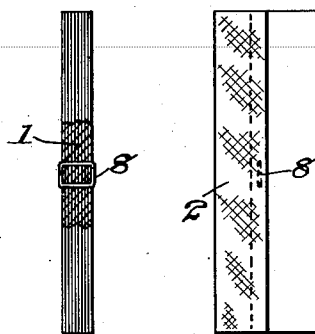
Fig. 11 represents a back view of the group of leaves, a portion being broken away to show the staple in full lines.
Figure 12:
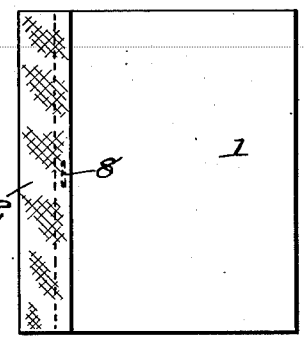
Fig. 12 represents a face view of the group of leaves after the overlapping portions of the hinge strips have been glued thereto over the staple.
Figure 13:
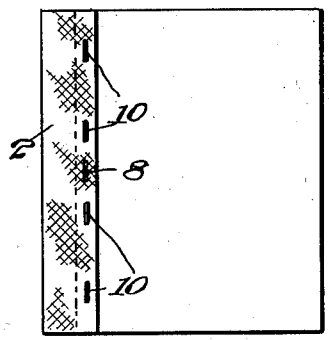
Fig. 13 represents a similar view after the hinge strips have been additionally secured to the group of leaves by side stapling.
Figure 14:
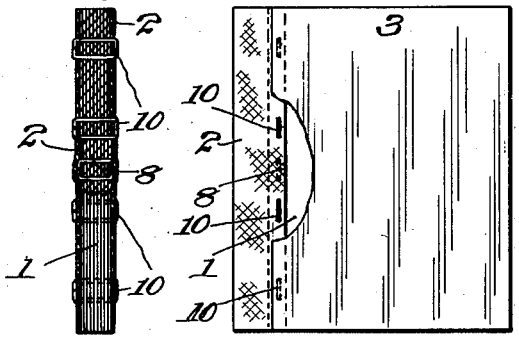
Fig. 14 represents a back view of the same a portion being broken away to show in full lines the staple for securing the group of leaves together and two of the staples for securing the hinge strips to the group of leaves.
Figure 15:
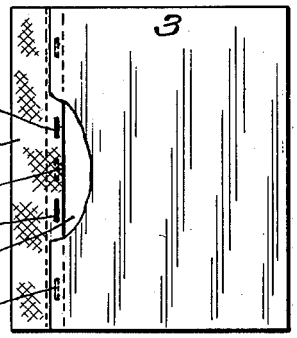
Fig. 15 represents a face view showing the fly leaves glued to the overlapping portions of the hinge strips, a portion of one of the fly leaves being broken away to show in full lines two of the staples which secure the hinge strips to the group of leaves.
Figure 18:
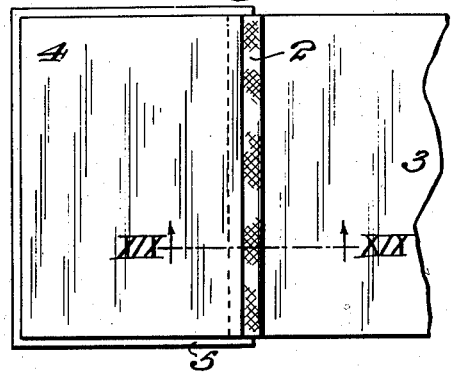
Fig. 18 represents a detail front view showing the covers glued to the cover leaves and to the free portions of the hinge strips.
Figure 16:
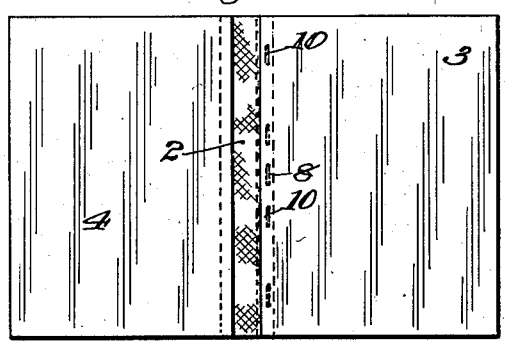
Fig. 16 represents a similar view with the two cover leaves glued to the free portions of the hinge strips.
Figure 17:
Fig. 17 represents an end view of the same.
Figure 19:
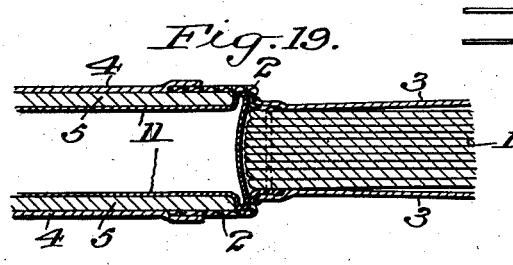
Fig. 19 represents on an enlarged scale a detail cross section taken in the plane of the line XIX—XIX of Fig. 18.

The leaves which form the body of the book are secured together as, for instance, by side staples. In the form shown in Figs. 1 to 9 inclusive the side staples 6 and 7 are located at the upper and lower back edges of the leaves. In the form shown in Figs. 10 to 19 inclusive the side staple 8 is shown as located at the middle back edges of the leaves.

Overlapping portions of the hinge strips are laid along the back edges of the group of leaves over the staples or staple as the case may be. These hinge strips are secured to the front and back faces of the group of leaves as, for instance, by gluing the overlapping portions of the hinge strips thereto. In the form shown in Figs. 1 to 9 inclusive the hinge strips are additionally secured to the group of leaves by side stitching 9. In the form shown in Figs. 10 to 19 inclusive the hinge strips are additionally secured to the group of leaves by a line of side staples 10.

The fly leaves 3 are secured to the exposed faces of the overlapping portions of the hinge strips 2 as, for instance, by gluing the fly leaves to the hinge strips.

The cover leaves 4 are secured to the free portions of the hinge strips 2 as, for instance, by gluing the cover leaves to the hinge strips.

The cover boards 5 are secured to both the cover leaves and the opposite faces of the hinge strips as, for instance, by gluing the cover boards to said cover leaves and hinge strips.

The cover boards and the back of the group of leaves may be protected by a suitable covering 11.

It is evident that where I have referred to certain of the parts as being glued to other parts, I wish to include any means whereby said parts are caused to adhere.

It is also evident that various changes may be resorted to in the construction, form and arrangement of the several parts without departing from the spirit and scope of my invention, and hence I do not intend to be limited to the particular embodiments herein shown and described, but what I claim is:

A book comprising a group of leaves, means for securing them together adjacent their back edges, hinge strips overlapping the group of leaves over their securing means, additional means passing through the group of leaves and said overlapping portions of the hinge strips for securing them together, fly leaves, and means for securing them to said overlapping portions of the hinge strips over the means which secures the hinge strips and group of leaves together.

ELBRIDGE W. PALMER.